United States Patent
Hengler et al.

(10) Patent No.: US 6,550,873 B1
(45) Date of Patent: Apr. 22, 2003

(54) ELECTRO-HYDRAULIC UNIT FOR CONTROLLING THE BREAKING PRESSURE IN A HYDRAULIC BRAKING SYSTEM OF A VEHICLE

(75) Inventors: Robert Hengler, Kardorf (DE); Tobias Fluck, Blumberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,827

(22) PCT Filed: Sep. 14, 2000

(86) PCT No.: PCT/DE00/03196

§ 371 (c)(1),
(2), (4) Date: Jun. 24, 2002

(87) PCT Pub. No.: WO01/26945

PCT Pub. Date: Apr. 19, 2001

(30) Foreign Application Priority Data

Oct. 13, 1999 (DE) .......................................... 199 49 221

(51) Int. Cl.⁷ .............................. B60T 8/36; H02K 5/12
(52) U.S. Cl. ................................. 303/119.3; 303/116.4; 310/71
(58) Field of Search ........................... 303/116.4, 119.2, 303/119.3; 310/71, 88

(56) References Cited

U.S. PATENT DOCUMENTS 5,164,625 A * 11/1992 Hofmann et al. ............. 310/88
5,957,548 A * 9/1999 Wetzel ...................... 303/119.3
6,224,169 B1 * 5/2001 Aoki et al. ............... 303/116.4

FOREIGN PATENT DOCUMENTS

EP 0 645 875 A 3/1995
EP 0 921 048 A 6/1999

OTHER PUBLICATIONS

Patent Abstracts of Japan vol. 1996, No. 05, May 31, 1996 & JP 08 011691 A, Jan. 16, 1996.
Patent Abstracts of Japan vol. 1997, No. 08, Aug. 29, 1997 & JP 09 098559 A Apr. 8, 1997.
Patent Abstracts of Japan vol. 1999, No. 09, Jul. 30, 1999 & JP 11 091528 A, Apr. 6, 1999.

* cited by examiner

Primary Examiner—Christopher P. Schwartz
(74) Attorney, Agent, or Firm—Michael J. Striker

(57) ABSTRACT

The invention relates to an electro-hydraulic unit (10) for regulating a brake pressure of a hydraulic vehicle braking system. The unit (10) includes a hydraulic block (12) with a hydraulic pump (20), an electric motor (14) for driving the hydraulic pump (20), and an electronic control unit (16), which is attached to the side of the hydraulic block (12) opposite from the electric motor (14). In order to electrically connect the electric motor (14) to the electronic control unit (16), the invention proposes embodying the electric motor (14) with a tubular insulator (40), which has spreader tabs (46) on a free end, which are pushed apart from each other by electrical blade contacts (42) that are contained in the insulator (40). The spreader tabs (46) that are pushed apart from each other rest without play in a through hole (48) of the hydraulic block (12) and position the blade contacts (42) on the hydraulic block (12). (FIG. 1)

10 Claims, 2 Drawing Sheets

ELECTRO-HYDRAULIC UNIT FOR CONTROLLING THE BREAKING PRESSURE IN A HYDRAULIC BRAKING SYSTEM OF A VEHICLE

BACKGROUND OF THE INVENTION

The invention relates to an electro-hydraulic unit for regulating the brake pressure of a hydraulic vehicle braking system. The term regulation here is understood to also include a control.

Units of this kind are used for antilock brake systems (ABS), traction control systems (TCS), electronic stability programs (ESP), and the like. EP 0 921 048 A2 has disclosed a unit of this kind. The known unit has a hydraulic block, which accommodates a hydraulic pump along with other hydraulic components such as solenoid valves. The hydraulic pump of the known unit is embodied as a two-piston pump, in which each piston is used to supply brake fluid in one of two independent brake circuits. An electric motor for driving the hydraulic pump is attached to one side of the hydraulic block. An electronic control unit for controlling electric motor and the solenoid valves is attached to the opposite side of the hydraulic block. In order to allow an electrically conductive connection (contacting) of electrical connections of the electric motor to the electronic control unit, the hydraulic block is provided with a through hole, which extends from the side of the hydraulic block to which the electronic control unit is attached to the side to which the electric motor is attached. An electrical contact, which is contained in a rod-shaped, preferably tubular insulator, is slid through the through hole in the hydraulic block; the electric motor is connected in an electrically conductive manner to the electronic control unit by means of the electrical contact.

SUMMARY OF THE INVENTION

In the electro-hydraulic unit in accordance with the-present invention, the insulator and the electrical contact contained in it are embodied so that they can move in the lateral direction. The lateral mobility is preferably achieved through an elasticity of the insulator arid of the electrical contact. Through the lateral mobility of the insulator and electrical contact, the unit according to the invention compensates for positional inaccuracies of the insulator with the electrical contact contained in it, which are the result, for example, of manufacturing and/or assembly inaccuracies, in relation to the hydraulic block. In addition, the insulator is embodied as expandable and according to the invention, it is expanded by the electrical contact contained in it so that the insulator rests without play in the through hole of the hydraulic block. In this manner, the invention achieves a precise position of the electrical contact in the hydraulic block. The invention prevents a large positional inaccuracy of the electrical contact in relation to the hydraulic block, which can otherwise occur as a result of the combined effect of a number of manufacturing and assembly inaccuracies. The electric motor is electrically connected to the electronic control unit simply by means of a plug connection with the electrical contact; the precise positioning of the electrical contact on the hydraulic block makes the electro-hydraulic unit well suited to an automated assembly. In comparison to the known unit, no additional parts are required so that no additional manufacturing costs are incurred. Another advantage of the invention is that the electrical contact in hydraulic block does not have to be sealed since the electric motor and the electronic control unit are attached to the hydraulic block in a sealed fashion and the electrical contact takes place within areas that are encompassed by the seals of the electric motor and electronic control unit. The plug connection for the electrical connection of the electric motor to the electronic control unit permits the control unit and the electric motor to be easily replaced.

In the preferred embodiment the insulator tapers toward a free end when it is not expanded, i.e. when it does not contain the electrical contact. With a round cross section, the insulator tapers conically, with a quadrilateral cross section, it tapers in the form of a pyramid or wedge. This embodiment of the invention has the advantage that when it is manufactured as an injection molded part made of plastic, the insulator can easily be removed from an injection molding tool without the injection molding tool having to be divided in the vicinity of the insulator. The electrical contact contained in the insulator expands the insulator, preferably only in the vicinity of its free end, in the opposite direction so that at the point of its greatest expansion, the insulator has at least the same dimension across as its largest point when it is not expanded. Through this expansion, it is possible to secure the insulator without play in a through hole of a constant diameter in the hydraulic block, in the vicinity of a free end of the insulator. Over its remaining length, the insulator has play in the through hole in the hydraulic block so that it can move laterally, along with the electrical contact contained in it.

In another embodiment, the insertion depth to which the electrical contact is inserted into a mating contact is not limited. This embodiment of the invention achieves a compensation in the longitudinal direction of the electrical contact between the electrical contact and a mating contact, which compensates for hydraulic blocks of different thickness and electronic control units of different heights.

BRIEF DESCRIPTION OF THE DRAWINGS

The invention will be explained in detail below in conjunction with an exemplary embodiment shown in the drawings.

DESCRIPTION OF THE PREFERRED EMBODIMENTS

Figure 1:
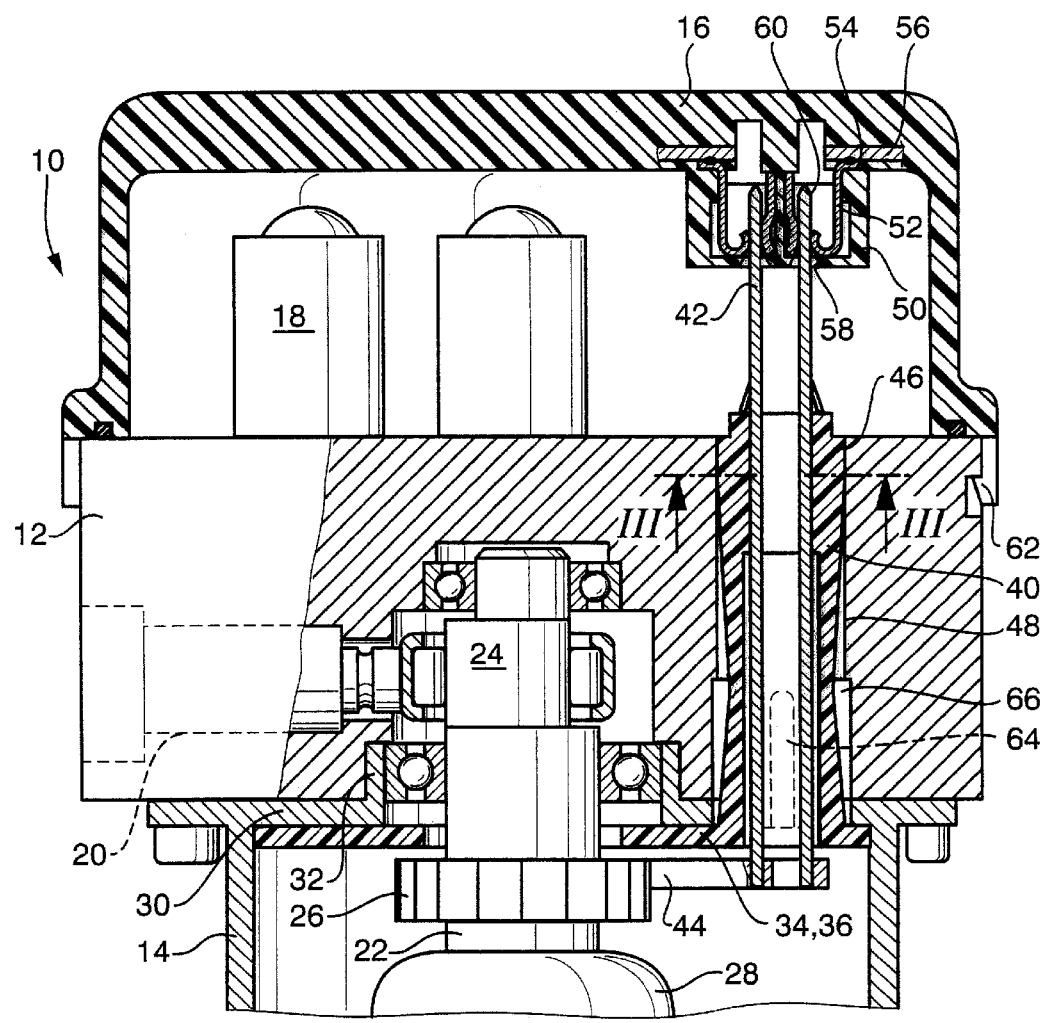
FIG. 1 shows a sectional view of an electro-hydraulic unit according to the invention.

The electro-hydraulic unit 10 shown in the drawing is provided for regulating a wheel brake cylinder pressure in a hydraulic vehicle braking system that is not otherwise shown. The unit 10 is used for antilock control during braking, traction control during acceleration and electronic stability control. The unit 10 has a hydraulic block 12, which has an electric motor 14 screwed to one side and a cap-shaped electronic control unit 16, which is almost rectangular when viewed from above, attached to its opposite side. For example, the hydraulic block 12 contains solenoid valves 18, of which FIG. 1 shows only the magnet coils and valve domes protruding from them. The hydraulic block 12 also contains a piston pump 20 with two pistons, which are disposed opposite from each other in relation to a motor shaft 22 of the electric motor 14, i.e. in a Boxer layout. The pistons of the piston pump 20 are disposed in the hydraulic block 12 in a plane perpendicular to the plane of the drawing. For the sake of a clear depiction, one of the two pistons of the piston pump 20 is shown in FIG. 1 rotated by 90° around the motor shaft 22; in FIG. 1, the piston has been rotated into the plane of the drawing. The piston pump 20 is driven in an intrinsically known manner by means of a cam 24, which in the exemplary embodiment shown is of one piece with the motor shaft 22. FIG. 1 also shows a collector ring 26, which is non-rotatably fixed to the motor shaft 22, and a part of an armature winding 28. The electric motor 14 has a hollow cylindrical collar 32 on an end wall 30, which rests against the hydraulic block 12; the electric motor 14 engages with the collar 32 in a precision-fit manner in a complementary recess in the hydraulic block 12 and is thus positioned on the hydraulic block 12.

Figure 2:
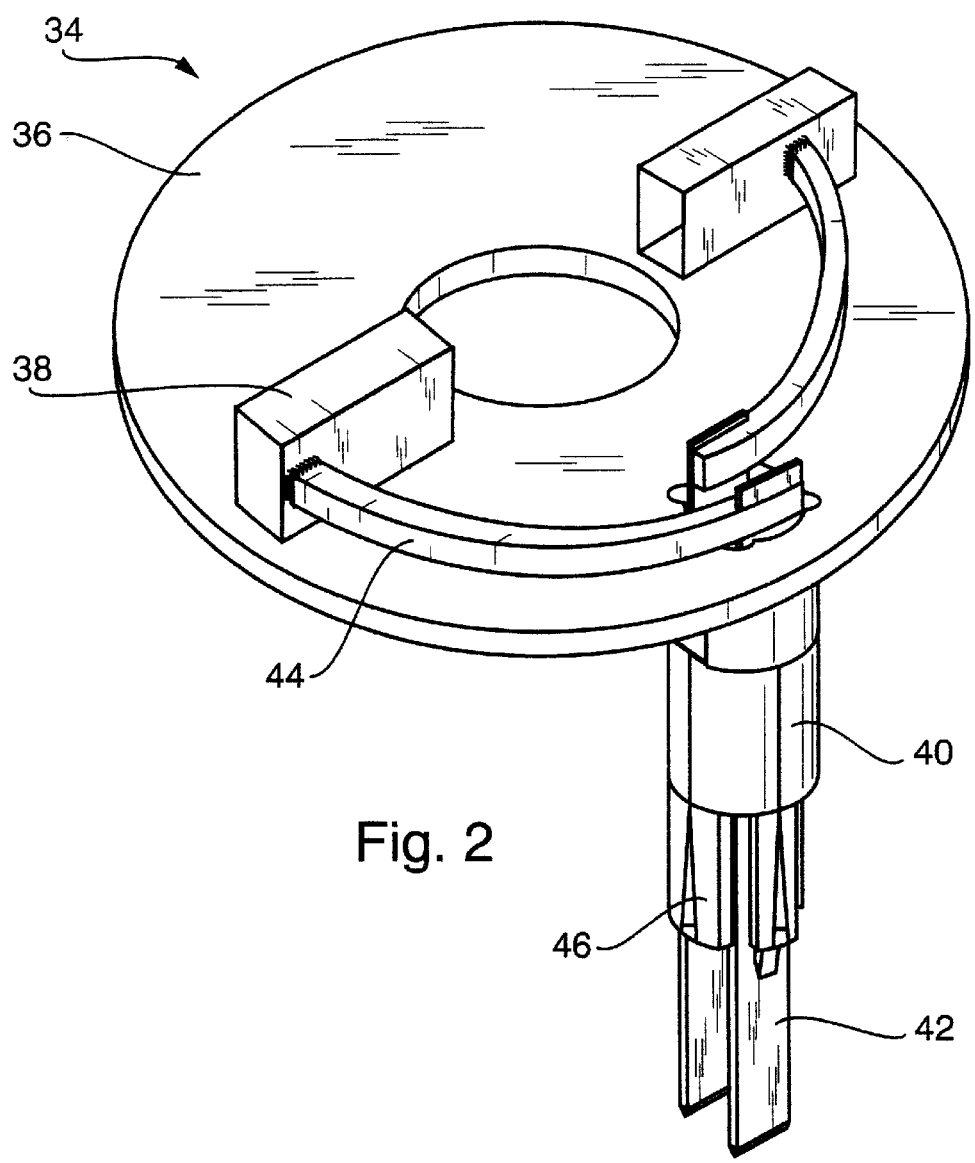
FIG. 2 shows a perspective representation of a brush plate of an electric motor of the unit from FIG. 1.

An inside of the end wall 30 of the electric motor 14, which rests against the hydraulic block 12, is provided with a brush holder 34, which is shown as a separate part in FIG. 2. The brush holder 34 has a circular perforated disk 36 made of plastic, which has two tubular brush-holders 38 attached to it on opposite sides. The tubular brush-holders 38 are comprised of sheet metal, have the shaped of a rectangular tube, and are each closed at the outer end. Spring-loaded pieces of carbon, not shown, can be inserted into the tubular brush holders 38 in a known fashion as brushes, which are pressed by their springs against the commutator 26 of the electric motor 14 and are used in a known manner to transmit electricity to the armature 28*th* of the electric motor 14.

A tubular insulator 40, which is of one piece with the perforated disk 36, protrudes from a side of the perforated disk 36 of the brush holder. 34 oriented away from the tubular brush holders. The insulator 40 is disposed at a point close to the outer edge of the perforated disk 36. The insulator 40 contains two electrical contacts 42. The two electrical contacts 42 are disposed parallel to and spaced apart from each other. The two electrical contacts 42 are made of sheet metal strips; they are so-called blade contacts and will be referred to as such below. The blade contacts 42 pass through a hole in the perforated disk 36 and by means of quarter-circular contact rails 44, are each connected in an electrically conductive manner to a respective tubular brush holder 38 and to the brush that is to be inserted into the tubular brush holder 38.

Figure 3:
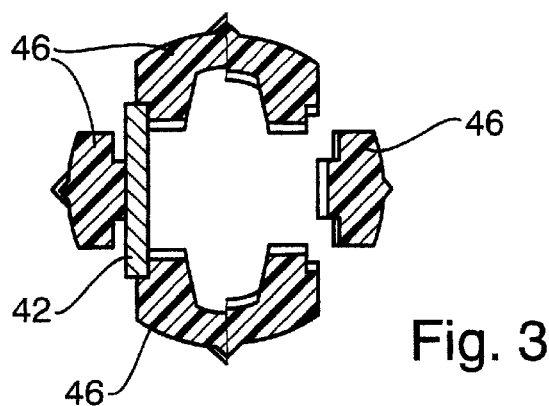
FIG. 3 shows a cross section through an insulator of the brush plate from FIG. 2.

At a free end spaced apart from the perforated disk 36, spreader tabs 46 are formed onto the tubular insulator 40 by means of longitudinal slits. The spreader tabs 46 are pushed apart from each other by the blade contacts 42 so that the insulator 40 expands in the direction of its free end in the vicinity of its spreader tabs 46. The expansion can be seen in FIG. 3, which shows a cross section through the insulator 40 in the vicinity of the spreader tabs 46. In the left half of FIG. 3, a blade contact 42 has been inserted, whereas in the right half of the drawing, the blade contact has not yet been inserted. As can be seen in FIG. 3, the spreader tabs 46 in the left half of the drawing are pushed apart from each other by the blade contact 42; the right half of FIG. 3 shows the spreader tabs 46 in their original position in which they have not yet been pushed apart. The two blade contacts 42 push all four spreader tabs 46 apart from each other. Originally, i.e. without the blade contacts 42, the insulator 40 has a slightly conical external form; it tapers over its entire length toward its free end so that it can be easily removed, for example from a plastic injection molding tool, which is divided only in a plane of the perforated disk 36 of the brush holder 34, but does not require any division, slider, or the like in the vicinity of the insulator 40 due to the conical shape of the insulator 40. The blade contacts 42 contained in the insulator 40 push the spreader tabs 46 apart from each other so that in the vicinity of its spreader tabs 46, the insulator 40 expands out counter to its original conical shape in the direction of its free end; with the blade contacts 42 contained in it, the insulator 40 has its greatest diameter in the vicinity of its free end. Outside the spreader tabs 46, the blade contacts 42 rest loosely in the insulator 40; the blade contacts 42 can be moved laterally in all directions. Due to its elasticity, the tubular insulator 40 can also be moved laterally in all directions.

When the electric motor 14 is attached to the hydraulic block 12, the insulator 40 with the blade contacts 42 contained in it is inserted through a stepped cylindrical through hole 48 in the hydraulic block 12. A diameter of the through hole 48 is matched to a diameter of the insulator 40 so that in the vicinity of its expanded free end, the insulator 40 is contained without play in the through hole 48 and has play over the rest of its length. In this manner, the insulator 40, along with the blade contacts 42 contained in it, is precisely positioned on the hydraulic block 12 at the point at which it emerges from the through hole 48 remote from the electric motor 14, i.e. on the side of the hydraulic block 12 oriented toward electronic control unit 16. Manufacturing and assembly tolerances of the electric motor 14, including its brush holder 34, do not influence the precision of the positioning of the blade contacts 42 and the insulator 40 on the side of the hydraulic block 12 oriented toward electronic control unit 16.

The electronic control unit 16, which is extrusion coated with plastic, has a plug housing 50, which is of one piece with the plastic of the control unit 16 and is oriented toward the hydraulic block 12. As mating contacts for the blade contacts 42, the plug housing 50 contains two plug receptacles 52, which are insulated from each other and into which the blade contacts 42 are plugged. Terminal contacts 54 bent at right angles connect the plug receptacles 52 in an electrically conductive manner to strip conductors 56 of a pressed screen by means of spot welding. The pressed screen with the strip conductors 56 is cast into the plastic of the electronic control unit 16, the rest of which is not visible here. Both the plug housing 50 and the blade contacts 42 have insertion bevels 58, 60, which facilitate the insertion of the blade contacts 42 of the electric motor 14 into the plug receptacles 52 of the electronic control unit 16. The electronic control unit 16 has detent projections 62 with which it is detent connected to the hydraulic block 12.

The electronic control unit 16 is affixed by simply being placed against the hydraulic block 12 so that the detent projections 62 of the electronic control unit 16 engage in detent fashion in the hydraulic block 12. Since the blade contacts 42 of the electric motor 14, due to the spreader tabs 46 of the insulator 40 that are pushed apart from each other by the blade contacts 42, are precisely positioned on the side of the hydraulic block 12 oriented toward the electronic control unit 16, the electronic control unit 16 can be easily placed onto the hydraulic block 12 and the blade contacts 42 are assured of reaching into the plug receptacles 52 of the electronic control unit 16 when the electronic control unit 16 is placed onto the hydraulic block 12 in the manner provided so that the electric motor 14 is electrically connected to the electronic control unit 16. Through the precise positioning of the blade contacts 42 on the side of the hydraulic block 12 oriented toward the electronic control unit 16, the electro-hydraulic unit 10 according to the invention is well suited to an automated assembly or at any rate to an automated placement of the electronic control unit 16 onto the hydraulic block 12.

The plug receptacles 52 are designed so that it is possible to slide the blade contacts 42 through; the plug receptacles 52 do not limit an insertion depth of the blade contacts 42. As a result, a distance between the electric motor 14 and the electronic control unit 16 can be varied, thus making it possible to connect the electric motor 14 to hydraulic blocks 12 of different thicknesses and electronic control units 16 of different heights, without changing the length of the insulator 14 and without changing the length of the blade contacts 42.

In the region in which the insulator 40 transitions in one piece into the perforated disk 36 of the brush holder 34, the insulator 40 has two longitudinal ribs 64, which are semicircular in cross section, protrude outward, and are enclosed in a larger diameter section 66 of the stepped through hole 48 in the hydraulic block 12. The longitudinal ribs 64 are disposed on the outside of the insulator 40 and are depicted with dashed lines in FIG. 1. The longitudinal ribs 64 of the insulator 40 assure a correct positioning of the insulator 40 in the hydraulic block 12.

What is claimed is:

1. An electro-hydraulic unit for regulating a brake pressure of a hydraulic vehicle braking system, comprising a hydraulic block including a hydraulic pump; an electric motor connected with said hydraulic block for driving said hydraulic pump; an electronic control unit attached to a side of said hydraulic block opposite from said electric motor; at least one electrical contact which connects said electric motor to said electronic control unit in an electrically conductive manner; a rod-shaped insulator in which said electrical contact is contained, said insulator with said electrical contact being inserted through a throughhole in said hydraulic block, which passes through said hydraulic block from a side of said hydraulic block to which said electric motor is attached, said insulator and said electrical contact being movable at least partially in a lateral direction, said electrical contact being formed as a blade contact that protrudes from said insulator at both ends, said insulator being expandable over only a part of its length; spreader elements disposed toward a free end for expanding said insulator and pushable apart from each other by said electrical contact, said electrical contact expanding said insulator so that in a vicinity of said spreader elements, said insulator rests without play in said throughhole of said hydraulic block.

2. An electro-hydraulic unit as defined in claim 1, wherein said insulator when not expanded tapers toward the free end, and in a region in which it is expanded by said electrical contact said insulator expanding in a direction opposite from a direction in which it tapers.

3. An electro-hydraulic unit as defined in claim 1, wherein said spreader elements and said insulator are formed as spreader tabs which are pushed apart from each other by said electrical contact.

4. An electro-hydraulic unit as defined in claim 1, wherein said insulator is formed as a tubular insulator.

5. An electro-hydraulic unit as defined in claim 1, wherein said insulator contains at least two said electrical contacts.

6. An electro-hydraulic unit as defined in claim 1, wherein said insulator is conical.

7. An electro-hydraulic unit as defined in claim 1, wherein in a region of said insulator which is expanded by said electrical contact, said electrical contact is secured without play in said insulator, and outside the region of said insulator which is expanded by said electrical contact said electrical contact has lateral play in said insulator.

8. An electro-hydraulic unit as defined in claim 1, and further comprising a mating contact through which said electrical contact is slid in an electrically conductive manner.

9. An electro-hydraulic unit as defined in claim 1, and further comprising a mating contact along which said electrical contact is slit along past said mating contact in an electrically conductive manner.

10. An electro-hydraulic unit as defined in claim 1, wherein said insulator and said electrical contact are connected to said electric motor.

* * * * *